United States Patent [19]
Saunders

[11] Patent Number: 5,651,434
[45] Date of Patent: Jul. 29, 1997

[54] BATTERY POWERED VEHICLE SYSTEMS

[76] Inventor: David Saunders, 13 Ermine Street, Caxton, Cambridge, CB3 8PQ, United Kingdom

[21] Appl. No.: 446,586
[22] PCT Filed: Nov. 27, 1992
[86] PCT No.: PCT/GB92/02206
§ 371 Date: Jun. 27, 1995
§ 102(e) Date: Jun. 27, 1995
[87] PCT Pub. No.: WO94/12364
PCT Pub. Date: Jun. 9, 1994
[51] Int. Cl.⁶ .................................................. B60M 1/20
[52] U.S. Cl. .................................. 191/2; 191/4; 191/40; 320/20
[58] Field of Search .......................... 191/2, 3, 4, 5, 191/6, 14, 15, 16, 40, 33 R; 320/20, 21; 180/2.1

[56] References Cited

U.S. PATENT DOCUMENTS

| 3,002,059 | 9/1961 | Mageoch | 191/6 |
| 3,888,336 | 6/1975 | Zajic | 191/2 X |
| 3,955,657 | 5/1976 | Bossi | 191/2 |
| 3,971,454 | 7/1976 | Waterbury | 191/4 X |

FOREIGN PATENT DOCUMENTS

| 2 336 272 | 7/1977 | France . | |
| 4205519 | 8/1993 | Germany | 191/4 |
| 7403570 | 9/1975 | Netherlands | 191/2 |

*Primary Examiner*—David A. Bucci
*Assistant Examiner*—Scott L. Lowe
*Attorney, Agent, or Firm*—Lee, Mann, Smith, McWilliams, Sweeney & Ohlson

[57] ABSTRACT

A public service vehicle transport system in which a vehicle powered by sodium/sulphur batteries is recharged through a pantograph at stations along its route from a pylon having arms which carry power conductors. The arms are carried by a rotable part of the pylon so as to be refracted over the pavement except when approach of the vehicle is sensed, whereupon the arms are automatically swung round over the road to enable recharging to take place.

20 Claims, 14 Drawing Sheets

5,651,434

BATTERY POWERED VEHICLE SYSTEMS

FIELD OF THE INVENTION

This invention relates generally to battery powered vehicle systems and more especially to apparatus for use in recharging the batteries of battery powered vehicles, particularly public service vehicles such as buses.

BACKGROUND TO THE INVENTION

Battery powered vehicles have been in use for a number of years. In particular, it is known to provide battery powered public service vehicles which during a period of duty are subject to interim recharging of the batteries between journeys at a bus station or depot. Such a system is disclosed in U.S. Pat. No. 3,955,657 where a battery powered public service vehicle is provided with contact means for recharging of the batteries. The contact means, typically a pantograph, can be raised to contact an overhead power conductor and receive electric current to recharge the batteries. The power conductor is carried by fixed laterally extending arms attached to posts which are connected to an electrical distribution network. A proposal has been made that, in order to increase efficiency, such vehicles should be equipped with sodium/sulphur batteries.

Sodium/sulphur batteries, which have recently been introduced, as compared with conventional rechargeable batteries, provide longer energy storage for less weight, and therefore will be subject to less discharge in powering a public service vehicle such as a bus over a given journey. Coupled with the fact that sodium/sulphur batteries can be recharged at higher rates, shorter periods of recharging should be possible with vehicles equipped with such batteries. It should therefore be possible to effect interim recharging of the batteries on the public highway, using the timetabled intervals between journeys or sections of journey, and a primary object of this invention is to provide apparatus for this purpose.

SUMMARY OF THE INVENTION

According to one aspect of the present invention, there is provided a public service vehicle transport system which comprises vehicles powered by batteries, preferably sodium/sulphur batteries, each vehicle being equipped with a pantograph which can be raised to enable the vehicle to receive electric current from an overhead power conductor for recharging the batteries, wherein, for carrying the overhead power conductor, there is provided a pylon off but adjacent the side of the road, the power conductor being carried by laterally extending arms at or adjacent the top of the pylon, which arms normally overhang the pavement or verge of the road and can be swung round to overhang the road for engagement of the power conductor by a vehicle pantograph.

According to another aspect of the invention, there is provided apparatus for recharging the batteries, preferably sodium/sulphur batteries, of a battery powered public service vehicle, said apparatus comprising a pylon off but adjacent the side of the road, said pylon having at or adjacent its top laterally extending arms carrying a power conductor, which arms normally overhang the pavement or verge of the road and can be swung round to overhang the road for engagement of the power conductor by a pantograph provided on the vehicle to receive electric current for recharging the vehicle batteries.

Preferably, the arms are swung round by rotation of at least the upper part of the column of the pylon.

Power to the power conductor carried by the arms is preferably transmitted from below ground level by cables extending through the pylon and the arms.

Normally, the arms will carry two power conductors, i.e. live and return conductors, in parallel relationship and in the operative mode extending lengthwise of the road, respectively for engagement by positive and negative recharge contact plates on the pantograph.

In a preferred embodiment, the pylon has two arms with mountings at their free ends between which the power conductors are extended. The arms are pivotally mounted to the pylon column and in an inoperative mode the arms are closed together, the conductors being retracted into either one or both of the mountings. The arms also have an opened-apart operative mode in which the mountings are spaced apart with the power conductors drawn out to extend between them. Preferably, the arms cannot be opened except when they are swung out to overhang the road. It is also preferred that the power conductors should not become live until the arms have been fully opened. This may be achieved by a contact means provided at the pivot for the arms, said contact means being operable by a coupling with the pivotted arms.

The pylon column preferably accommodates a transformer and rectifying means whereby the conventional a.c. power supply is transmitted to the power conductors as a d.c. voltage capable of supplying a high current, say of several hundred amps.

The rotating part of the pylon column preferably accommodates two electric motors, preferably d.c. motors, one for driving through suitable gearing the said part of the column in rotation and one for effecting the pivotal movement of the arms, again through suitable gearing.

For accommodating said motors, the rotary part of the pylon column is preferably provided with a housing which not only accommodates said motors, but also control circuitry therefor. This control circuitry conveniently includes a sensor, facing towards the road in the non-operable mode of the apparatus, for receiving a signal from an approaching vehicle which initiates an operative mode of the apparatus. A second sensor, facing the road in the operable mode of the apparatus, receives a signal from the vehicle to terminate the operative mode. Initiation of the operative mode is preferably automatic, but termination thereof is preferably under control of the driver of the vehicle.

The control circuitry preferably includes logic circuits whereby, on activation, the steps of rotation of the arms followed by opening apart thereof are automatically carried out, and vice versa on termination of the operative mode, although it would alternatively be possible to open the arms while rotation is taking place. The vehicle preferably also includes a sensor responsive to operation of the pylon, this sensor being associated with on-board control circuitry which governs raising and lowering of the pantograph and disconnection of the vehicle drive while the pantograph is raised.

BRIEF DESCRIPTION OF THE DRAWINGS

Further features of the invention will be apparent from the following description of an embodiment, making reference to the accompanying drawings, in which.

DESCRIPTION OF THE PREFERRED EMBODIMENT

Referring first to FIGS. 1 to 5, a roadside pylon carries pivotted to the top of its column 10 a pair of cranked arms 12 having mountings 14 at their free ends.

Figure 1:
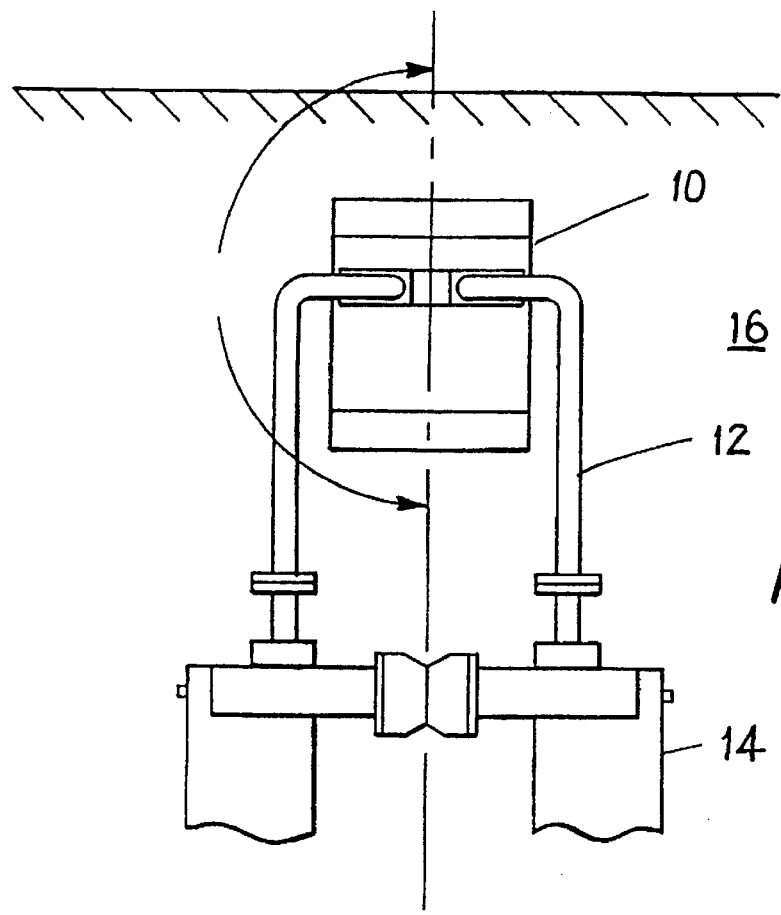
FIG. 1 is a plan view of a pylon in the non-operative mode.
Figure 2:
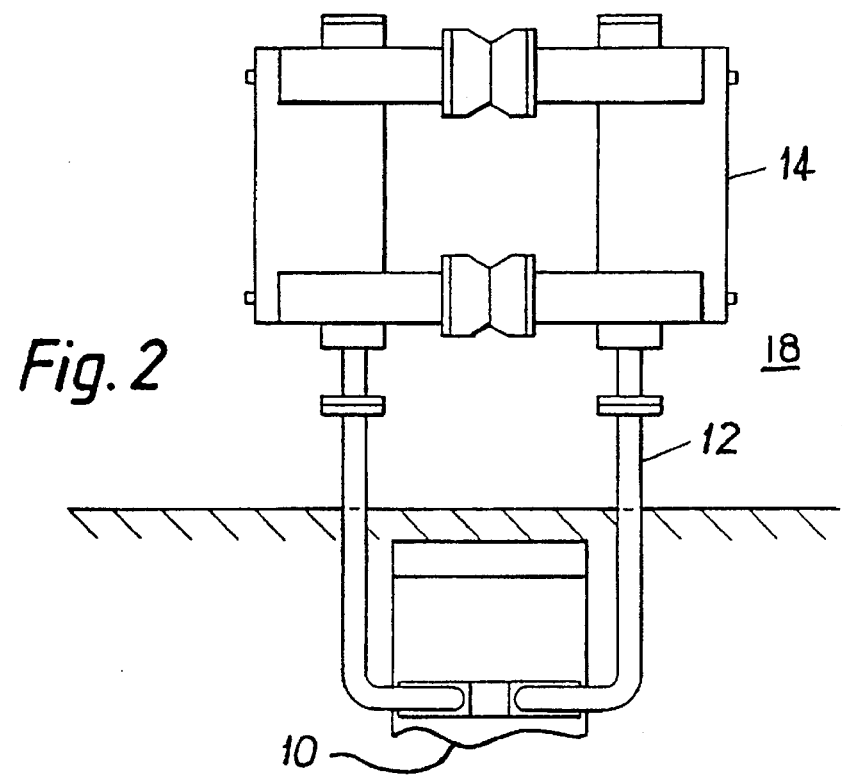
FIGS. 2 and 3 are plan and elevational views of the pylon at the end of the first stage of transfer into the operative mode.
Figure 3:
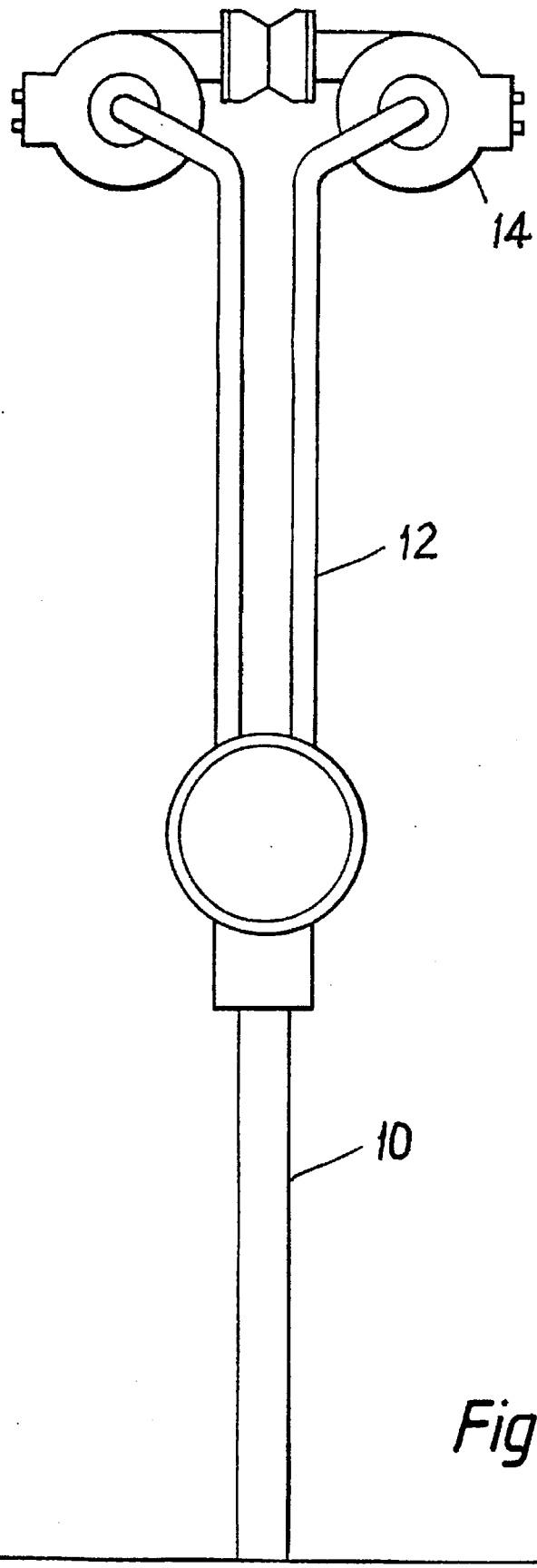
Figure 4:
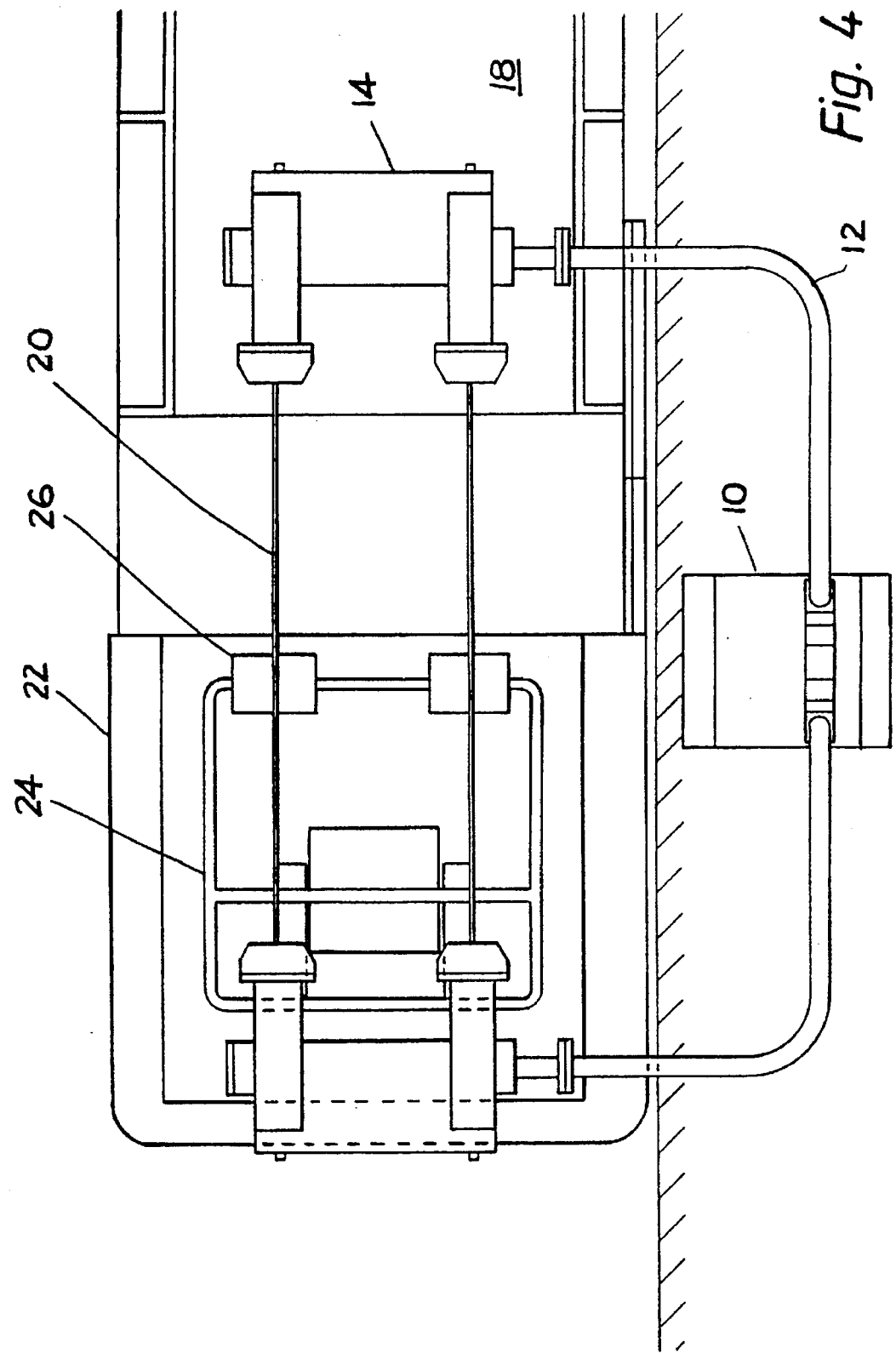
FIGS. 4 and 5 are plan and elevational views of the pylon in the operative mode, also showing an adjacent vehicle.
Figure 5:
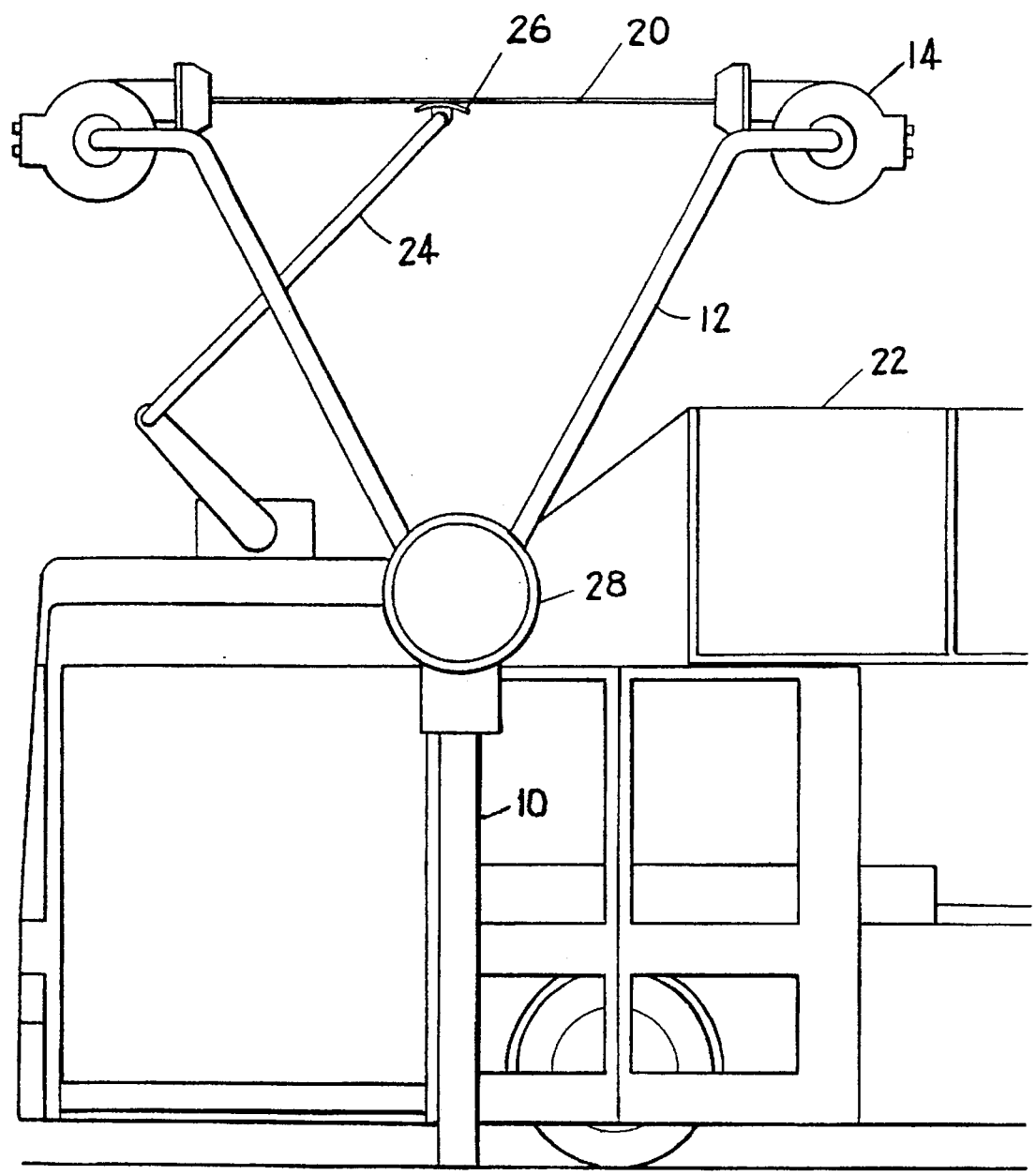
Figure 6:
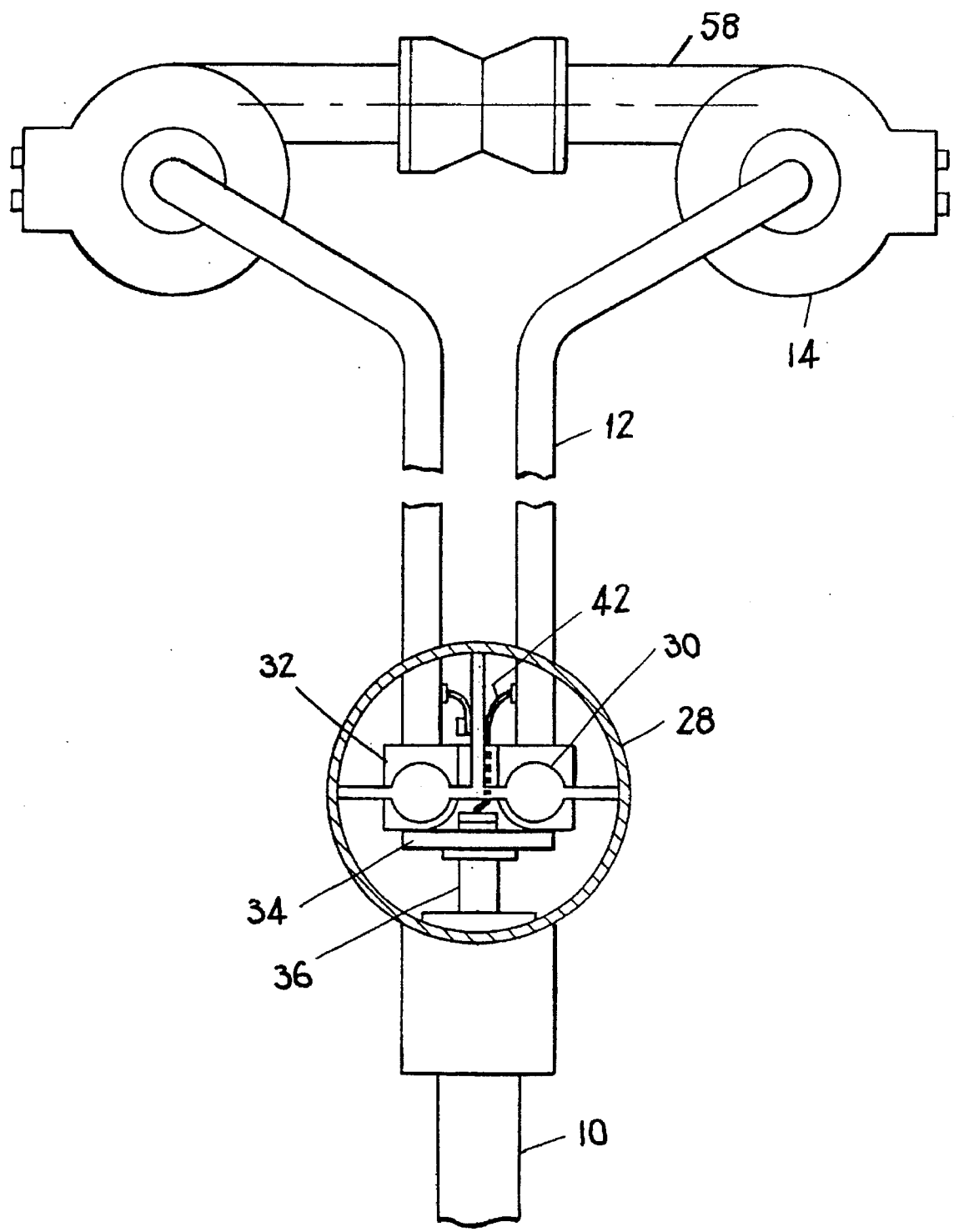
FIGS. 6, 7 and 8 show the upper part of the pylon in side elevation, plan and end elevation, respectively, in each instance partly in cross-section, when the pylon is still inoperative.
Figure 7:
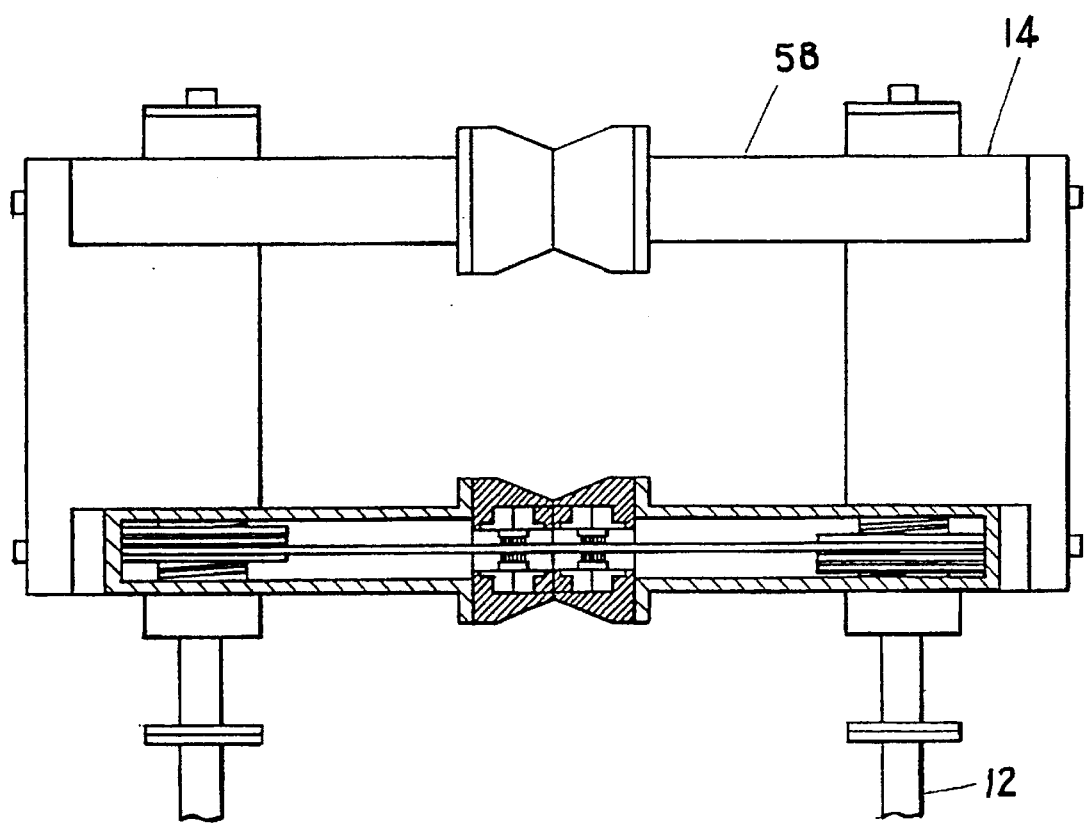

The pylon is mounted off but adjacent the side of a road and, in an inoperative mode, the arms 12 overhang the pavement or verge 16 of the road, as shown in FIG. 1. On initiation of an operative mode, the arms are swung round to overhang the road 18, as shown in FIG. 2. The arms 12, which are closed together in the inoperative mode, are then pivotted apart, as shown in FIGS. 4 and 5, whereby power conductors 20 are drawn out of the mountings 14 to extend above and along the length of the road 18.

A battery powered bus 22, having a raised pantograph 24 fitted with contact plates 26, can then engage the power conductors 20 to draw current for interim charging of its batteries, preferably sodium/sulphur batteries.

After battery charging has been completed, the pantograph can be lowered, and the pylon restored to the inoperative mode shown in FIG. 1, after which the vehicle can be driven away.

The above-described procedure is effected automatically. A sensor at the pylon recognises the approach of a bus, for example by recognition of a signal emitted from the bus, automatically initiating the transfer of the pylon from its inoperative to its operative mode. A sensor on the bus then recognises that the pylon is in its operative position, for example by recognition of a signal emitted from the pylon, automatically initiating the raising of the pantograph and de-activation of the bus power drive.

Battery recharging then automatically takes place when the pantograph contact plates engage the power conductors. After a battery recharging period, say of a few minutes, the driver initiates retraction of the pantograph, which is followed by the emission of a signal from the vehicle which is recognised by a second sensor at the pylon in order to initiate restoration of the pylon into its inoperative condition. A final signal from the pylon in its inoperative position is transmitted to the vehicle to re-engage the vehicle's drive mechanism.

The above-described automation of the process of interim recharging of the vehicle batteries ensures safety of operation.

Battery powered vehicles capable of interim recharging by a static pylon at a bus depot or the like are already known, and details of the vehicle, including heat-exchange systems associated with the batteries, preferred forms of driving motors, etc. are considered outside the scope of this specification. The present invention is more particularly concerned with the above-described operable pylon and this will now be described in more detail.

Referring to FIGS. 6 to 11, it can be seen that the top of the column 10 has a housing 28 which carries and accommodates the pivots 30 for the arms 12, as well as housing motorised driving equipment.

Figure 9:
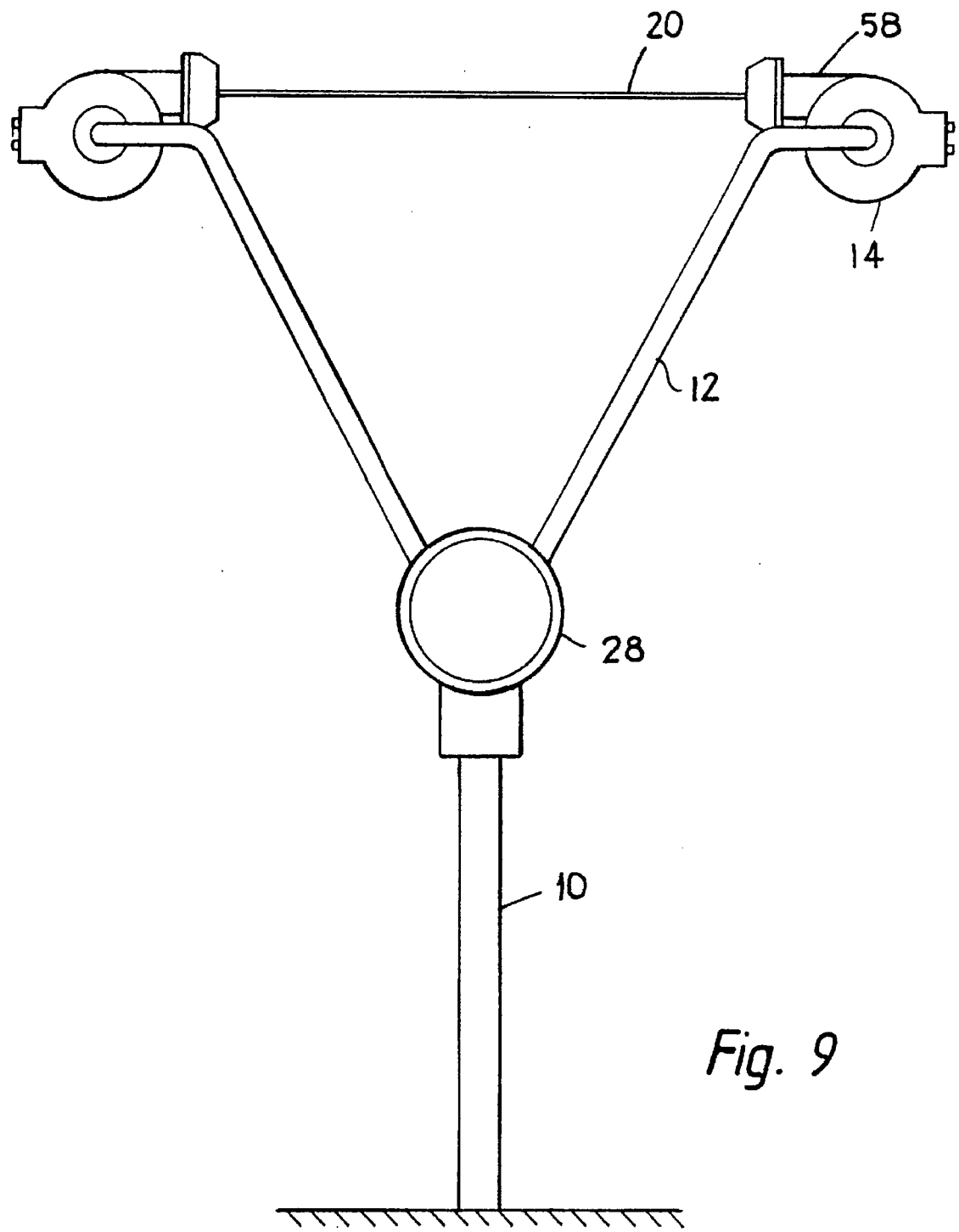
FIG. 9 is a side elevational view of the pylon in its operative mode.
Figure 10:
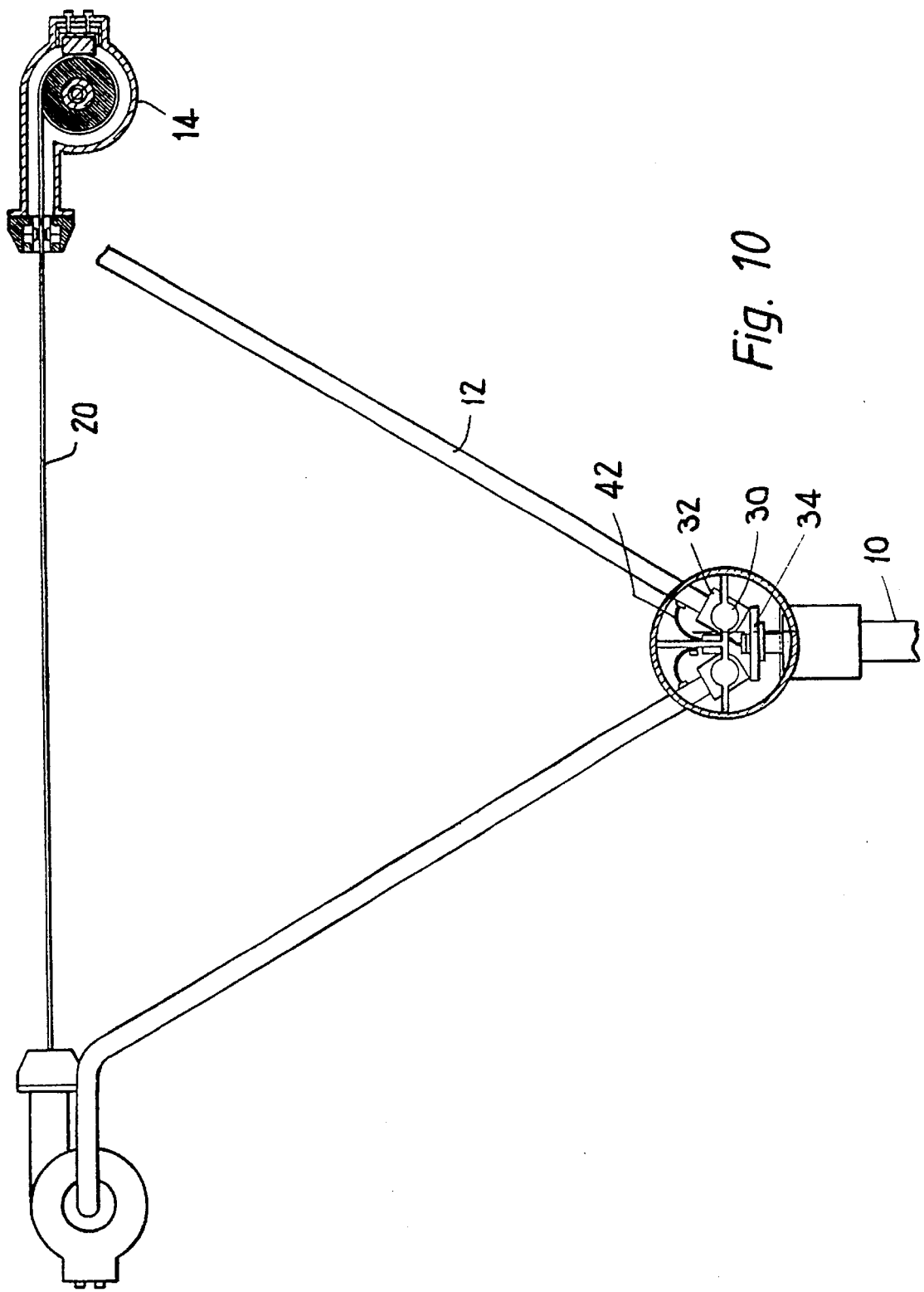
FIG. 10 shows the upper part of the pylon in side elevation in its operative mode, partly in cross-section.

The lower ends 32 of the arms are pivotally supported above an abutment plate 34 carried by a movable pin 36. This pin constitutes a movable contact which can be displaced downwardly to cooperate with the output terminal 38 of a transformer and rectifying means 40 (see FIGS. 8 and 11), which receives the conventional a.c. power supply. In the inoperative mode shown in FIGS. 6 to 8, the contact pin 36 is in an uppermost position disengaged from the transformer terminal 38. Thus, power is not transmitted to the cabling 42 which extends through the movable arms 12 to provide power to the power conductors 20. However, when as shown in FIGS. 9 to 11 the arms are opened apart into the operative mode, the contact pin 36 is displaced downwardly, due to the action of the lower ends 32 of the arms on the abutment plate 34, making contact with the terminal 38 only when the arms reach their final position in which the arms are maintained for battery recharging purposes.

Figure 8:
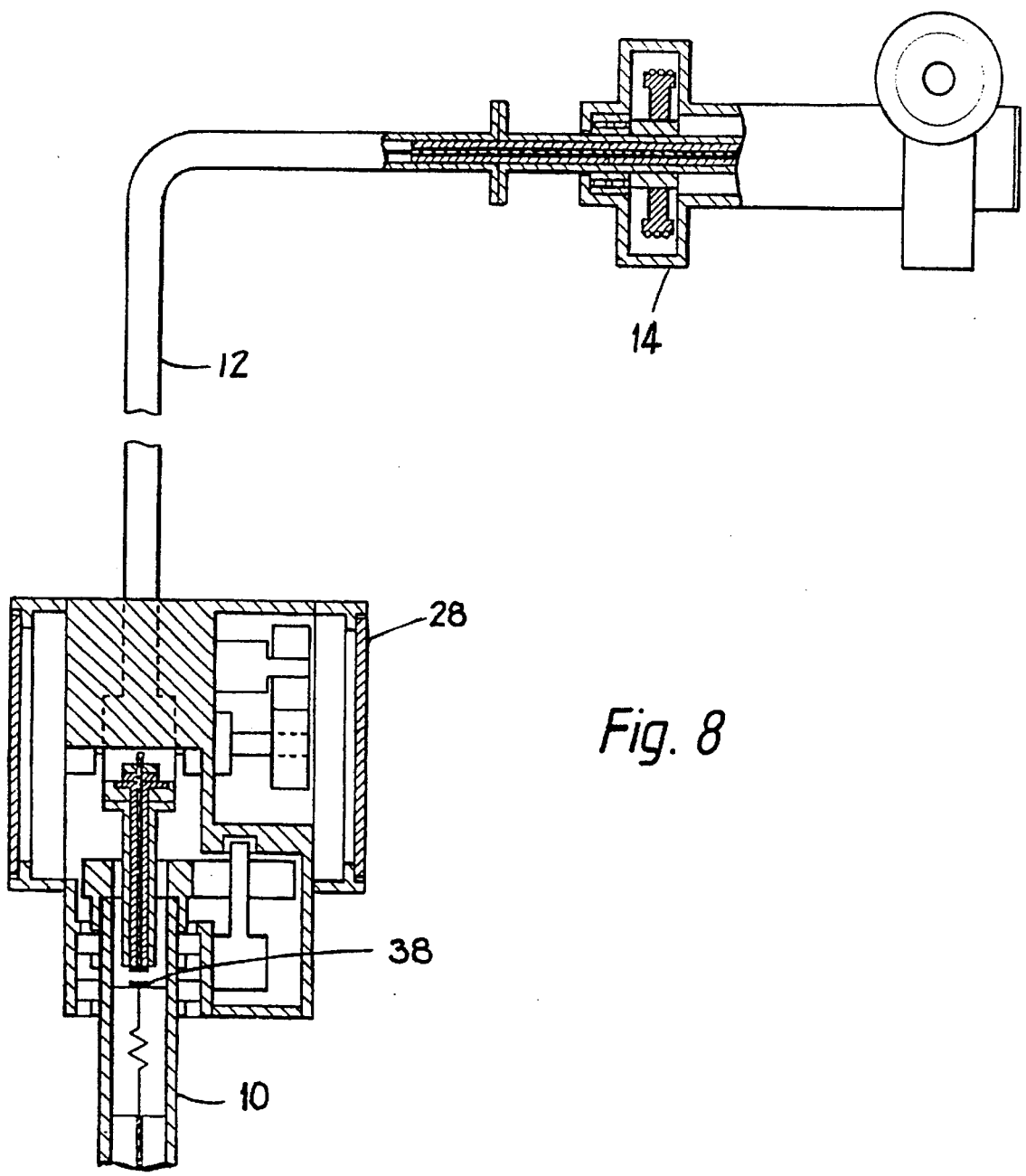
Figure 11:
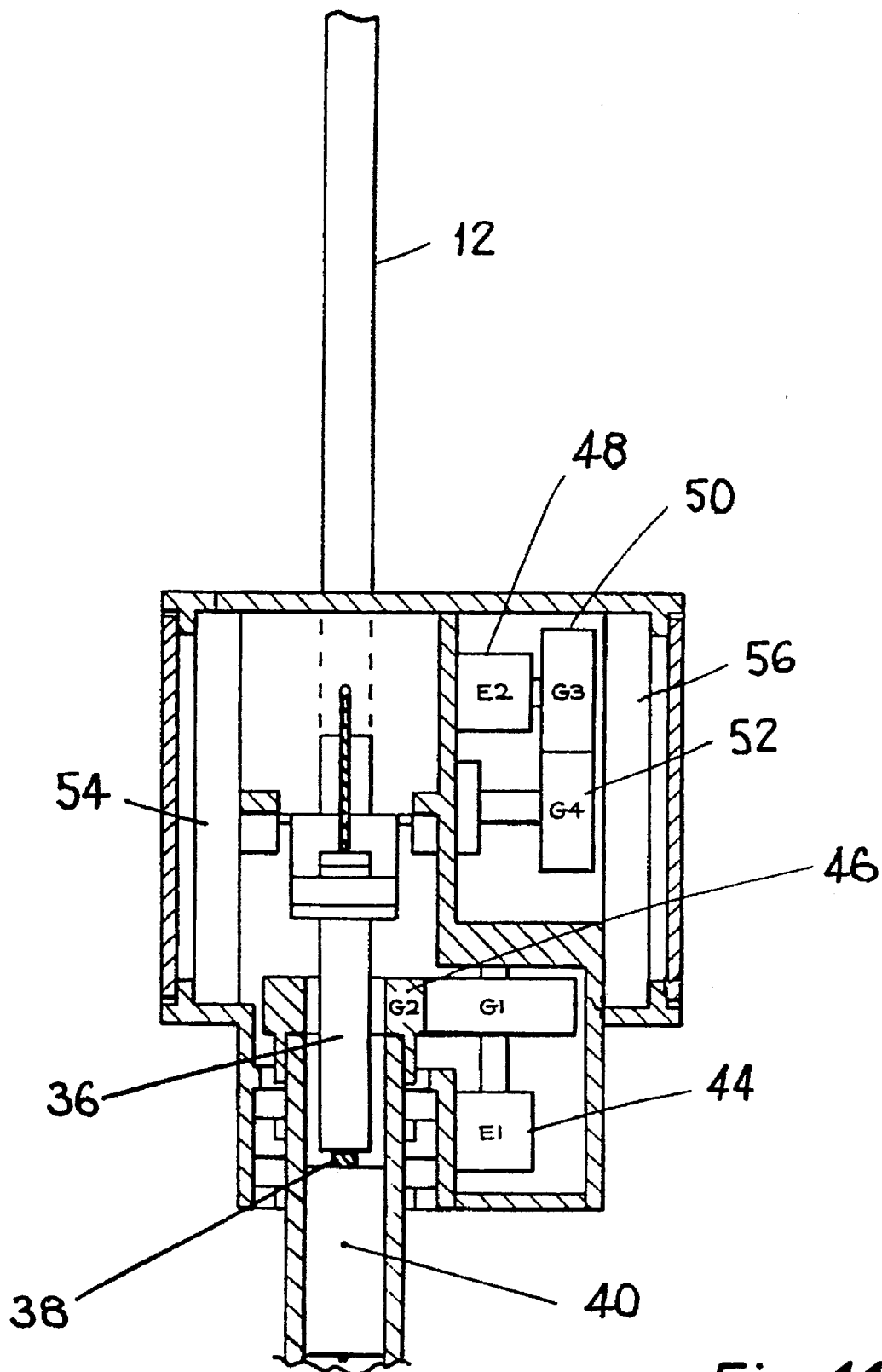
FIG. 11 shows detail of housing at the top of the pylon column.

FIGS. 8 and 11, in particular, show details of the driving means in the housing 28, which in fact constitutes the rotating part of the pylon column.

A d.c. reversible electric motor 44 drives a gearwheel 46 carried by the fixed lower part of the pylon column 10, whereby to drive the housing through 180 degrees in order to swing the arms 12 between a position in which they overhang the pavement or verge (the inoperative mode) and a position in which they overhang the road (as in the operative mode), and vice versa.

A further step in transfer between the two modes requires the arms 12 to be opened apart or closed together, and this is accomplished by the d.c. reversible electric motor 48, which drives gearwheel 50 which in turn meshes with gearwheels 52 fixed to armatures which drive the arms 12.

The main housing also accommodates two sub-housings 54, 56 which carry electronic control circuitry. Housing 54, which faces the road when the pylon is in its non-operative mode, includes a sensor (not shown) which receives a signal from an approaching bus and, on receiving said signal, activates logic circuits which first activate the motor 44 to swing the arms round over the road and then activate the motor 48 to open the arms and expose the power conductors. A transmitter is also housed to send a signal to the vehicle to re-engage the vehicle's drive mechanism.

The housing 56, which faces the road when the pylon is in its operative mode, includes a transmitter which sends a signal to the bus to cause the pantograph to be raised, and also a sensor which on command of the driver receives a signal from the bus and, on receiving said signal, activates logic circuits which control the motors 48 and 44 to cause said motors to operate sequentially to restore the pylon to its inoperative mode.

It is to be noted that, in the preferred system, the vehicle drive is automatically rendered inoperative once the pantograph is raised, and cannot be re-engaged until the pylon is returned to its non-operative position.

The pylon will preferably be embodied as a bus stop, and accordingly the electronic sub-housings, exposed on the outside of the main housing, may have illuminated translucent plastics covers which carry relevant information. It is visualised that other bus stops will be provided in a matching style, but without a battery recharging facility.

Figure 12:
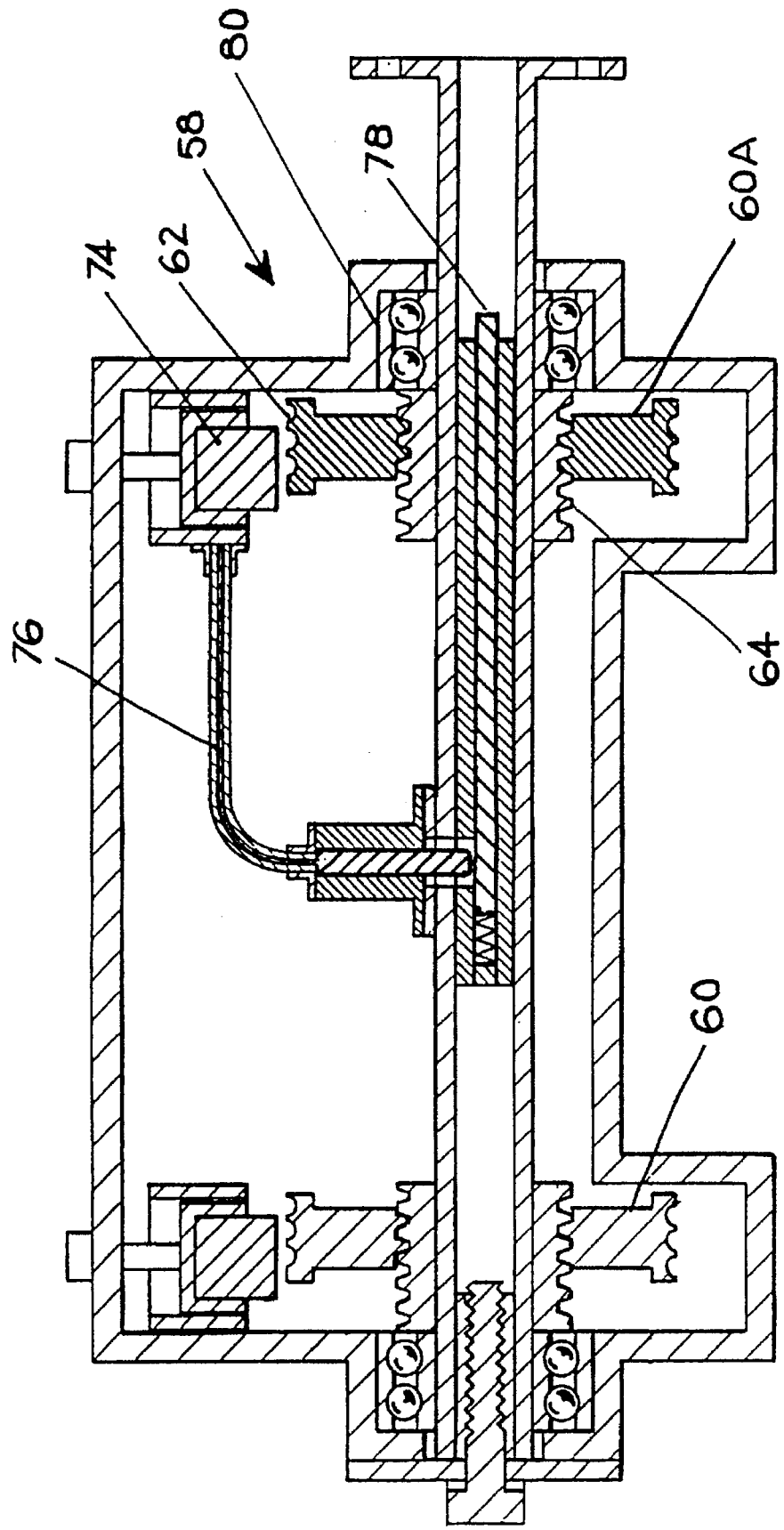
FIGS. 12 to 14 show details of mountings carried by the outer ends of the arms of the pylon.
Figure 13:
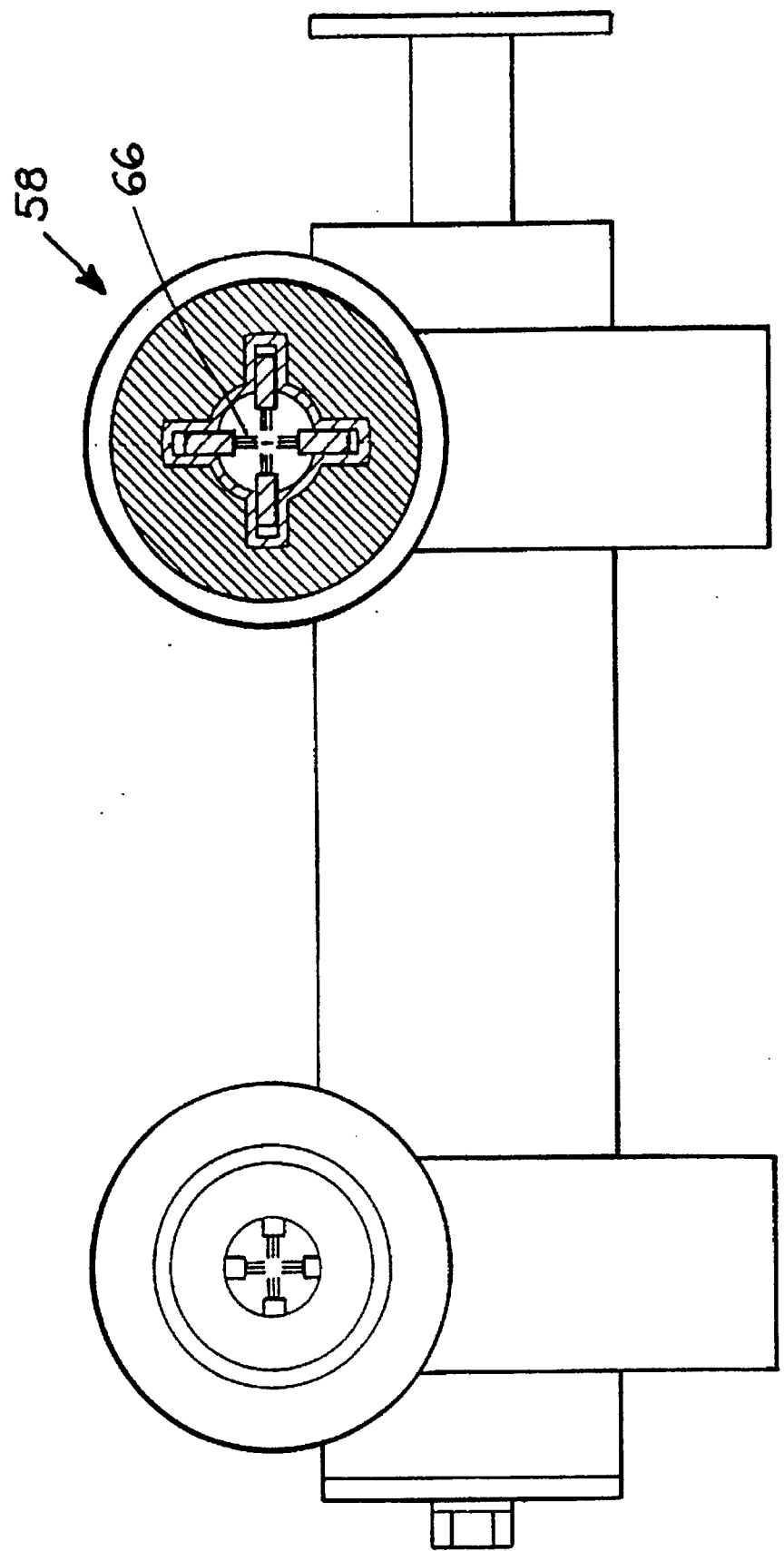
Figure 14:
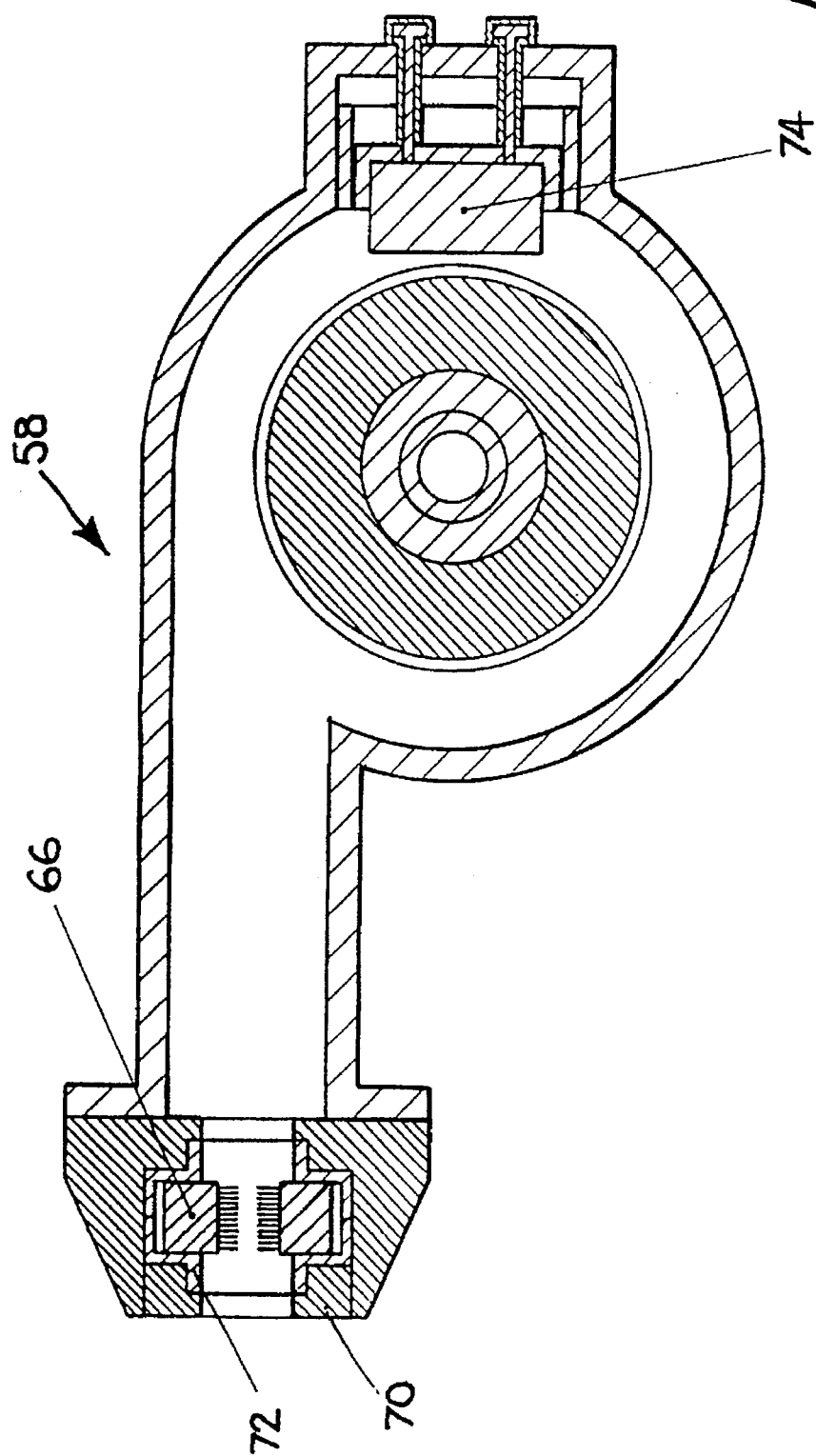

FIGS. 6 to 11 also show mountings 58 (shown as 14 in earlier FIG. 1) at the outer ends of the arms 12, between which the power conductors extend. However, detail of one such mounting is better shown in FIGS. 12 to 14 and will be described with reference thereto.

Each mounting 58 (previously 14) includes conductor wheels 60 on which the power conductors (omitted for clarity in FIGS. 12 to 14) are wound when the arms 12 are closed together. The conductors are drawn from the wheels 60 when the arms are opened apart. At least 60A, which carries the live power conductor, is made of electrically insulating material. For precision winding of the conductors, the peripheries of the wheels are helically grooved as indicated at 62.

The wheels turn on a spiral thread 64, thereby to ensure that the conductors run a true course through brush scarifiers 66 fitted to the ends of extensions 68 which form part of the mounting 58 (previously 14). The brush scarifiers 66 are wire brushes which clean the conductors as the conductors are drawn out of the mountings, thus ensuring that good electrical contact will be made with the contact plates on the pantograph of the vehicle. Ready replacement of the brushes 66 is enabled by removing cover 70 and the part 72 of the brush casing, and it is not necessary to detach the conductor wires for this purpose.

Power is transmitted to the conductor wires by the contact shoes 74, which are connected by cabling 76 with the cable (which is a solid conductor) 78 which extends into the mounting 58 (previously 14) from within the pylon arms. From FIG. 12 it will be clear that the present embodiment envisages an electrically conducting wheel 60 for the non-live power conductor, which will thus constitute an earth conductor completing its circuit through the wheel 60 and the pylon arm. However, such an arrangement is not essential, and not necessarily preferred.

Finally, it is to be noted that the mounting 58 (previously 14), which in effect constitutes a wheelbox, is counterbalanced on bearings 80, and is able to float freely in the horizontal plane defined by the upper parts of the pylon arms, both when said arms are closed and open. This ensures that the power conductors remain taut at all times.

Figure 15:
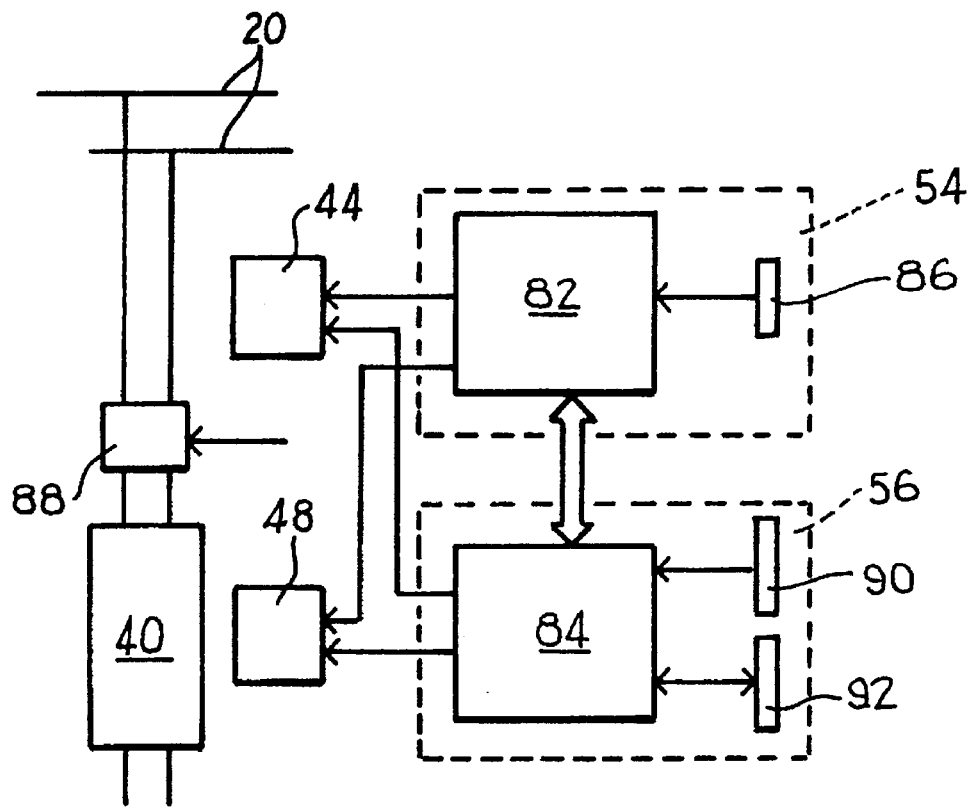
FIG. 15 illustrates a block diagram of the control circuitry in the pylon.

Referring to FIG. 15, there is shown in block diagram form the control circuitry in the pylon.

References 82, 84 denote the logic control circuits within the respective housings 54, 56. Sensor 86 provides an input to the logic circuitry 82 on detection of an approaching vehicle, whereby the logic control circuitry causes operation of motors 44, 48 to drive the pylon into its operative position. Switch 88 (in fact constituted by abutment plate 34 and pin 36 previously described) is operated when the pylon completes movement into its operative position, thereby to cause d.c. power to be supplied from the transformer and rectifying means 40 to the power conductors 20. Transmitter 92 (see below) then sends a first signal to the vehicle.

At the end of charging, sensor 90 receives a signal from the vehicle, whereby the logic circuitry 84 causes the motors 44, 48 to restore the pylon to its inoperative position, and on completion of this movement, causes a final signal to be sent by transmitter 92 to the vehicle.

Figure 16:
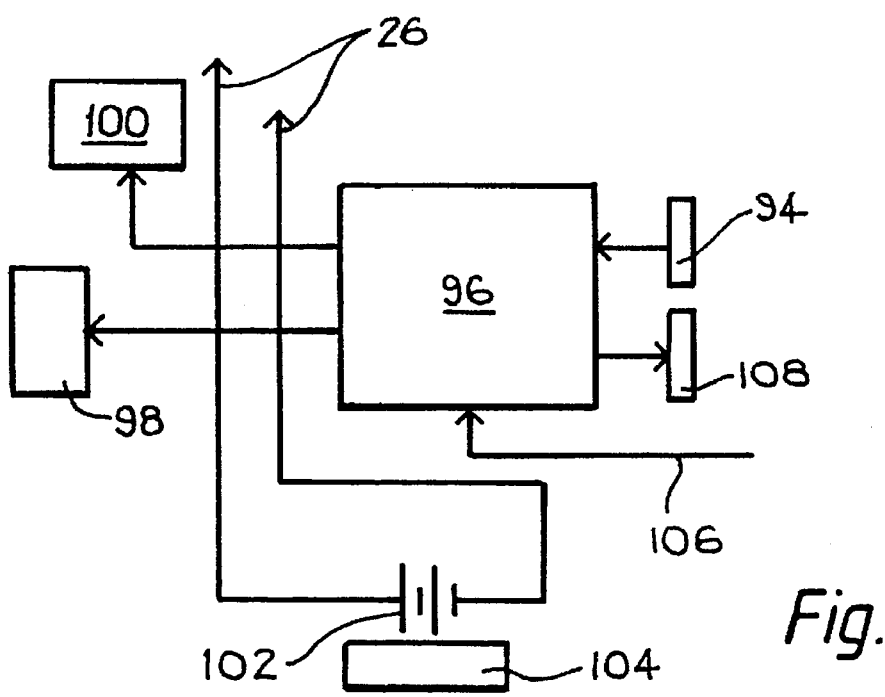
FIG. 16 is a block diagram of the circuitry on board the vehicle.

FIG. 16 shows the circuitry on board the vehicle in block diagram form.

Sensor 94, on receipt of the first signal from the pylon, sends a signal to logic circuitry 96 which in turn switches off the vehicle driving motor 98 and switches on the drive motor 100 for the vehicle pantograph. When and while the pantograph contact plates 26 are in engagement with the power conducters 20, the vehicle batteries 102, cooled by cooling means 104 in view of the high charging current, are charged for a period of time terminated by a driver initiated input 106 to the control circuitry 96. This circuitry then successively causes the motor 100 to lower the pantograph and send a signal by transmitter 108 to the pylon, thereby initiating restoration of the pylon to its inoperative position. On receiving the above-mentioned final signal from the pylon, the logic circuitry 96 enables the vehicle driving motor 98 to be switched on again.

Various modifications of the above-described and illustrated arrangement are possible within the scope of the invention hereinbefore defined.

Although not shown, an overcharge overide may be provided to terminate charging if after a predetermined time, or voltage, is reached the driver initiated stop-charging signal has not been received.

In a similar manner temperature sensing means and associated switching means (not shown) may be provided adopted to interrupt charging in the event of either a too-steep rise in temperature or a too-high absolute temperature level is detected in or around the battery compartment.

I claim:

1. Apparatus constituting a public service vehicle transport system comprising:
   a vehicle movable along a road,
   batteries for powering the vehicle,
   an overhead power conductor for supplying electric current to recharge the batteries,
   a pantograph attached to the vehicle which is raisable to engage the overhead power conductor to enable the vehicle to receive the electric current,
   a pylon, off but adjacent to a side of the road, the pylon including,
      laterally extending arms at or adjacent a top of the pylon, the arms carrying the overhead power conductor, said arms normally overhanging the side of the road, and
      means for swinging the arms to overhang the road so that the power conductor may be engaged by the pantograph.

2. Apparatus according to claim 1, in which the batteries are sodium/sulfur batteries.

3. Apparatus according to claim 1, wherein the means for swinging the arms comprises means for rotation of at least an upper part of the pylon.

4. Apparatus according to claim 1, wherein power to the power conductor carried by the arms is transmitted from below ground level by cables extending through the pylon and the arms.

5. Apparatus according to claim 1, wherein the pylon includes a transformer and a rectifier and wherein conventional A.C. power is transformed and rectified to a D.C. power before being supplied to the power conductor.

6. Apparatus according to claim 1, wherein the vehicle also includes a sensor responsive to operation of the pylon, said sensor being associated with on-board control circuitry which governs raising and lowering of the pantograph and disconnection of a vehicle drive while the pantograph is raised.

7. Apparatus according to claim 1, wherein the arms carry two power conductors in parallel relationship and extending lengthwise of the road, respectively for engagement by positive and negative recharge contact plates on the pantograph.

8. Apparatus according to claim 7, wherein the pylon has two arms with mountings at their free ends between which the power conductors are extended.

9. Apparatus according to claim 8, wherein each arm is attached to the pylon above a pivot and in an inoperative mode the arms are closed together, the conductors being retracted into either one or both of the mountings, the arms also having an opened-apart operative mode in which the mountings are spaced apart with the power conductors drawn out to extend between them.

10. Apparatus according to claim 9, wherein the arms cannot be opened except when they are swung out to overhang the road.

11. Apparatus according to claim 9, wherein a contact means for switching on and off power is provided and wherein the power conductors do not become live until the arms have been fully opened.

12. Apparatus according to claim 11, wherein the contact means is provided at the pivot for the arms, said contact means being operable by a coupling with the pivotted arms.

13. Apparatus according to claim 9, wherein the pylon accommodates two electric motors, one for driving, through suitable gearing, the means for swinging the arms, and one for effecting the pivotal movement of the arms, again through suitable gearing.

14. Apparatus according to claim 13, wherein the electric motors are d.c. motors.

15. Apparatus according to claim 13 wherein the pylon is provided with a housing which accommodates said motors and control circuitry therefor.

16. Apparatus according to claim 15, wherein the control circuitry includes a sensor, facing towards the road for receiving a signal from an approaching vehicle which initiates the operative mode of the apparatus.

17. Apparatus according to claim 16, wherein the control circuitry includes logic circuits, the logic circuits automatically activating the means for swinging the arms, and automatically causing the opening apart of the arms, during a beginning of the operative mode; and the logic circuits automatically activating the means for swinging the arms, and automatically causing the closing of the arms, during a beginning of the inoperative mode.

18. Apparatus according to claim 16, wherein the control circuitry includes a second sensor, facing the road, for receiving a signal from the vehicle to terminate the operative mode.

19. Apparatus according to claim 18, wherein initiation of the operative mode is automatic, but termination thereof is under control of a driver of the vehicle.

20. Apparatus for recharging the batteries of a battery powered public service vehicle, said apparatus comprising a pylon off but adjacent a side of the road, said pylon having at or adjacent its top, laterally extending arms carrying a power conductor, which arms normally overhang the side of the road and can be swung round to overhang the road for engagement of the power conductor by a pantograph provided on the vehicle to receive electric current for recharging the vehicle batteries.

* * * * *